United States Patent [19]

Stenz et al.

[11] 4,404,744

[45] Sep. 20, 1983

[54] METHOD OF MAKING ELECTRICAL CONTACTS

[75] Inventors: Paul Stenz; Manfred Wilmes, both of Detmold, Fed. Rep. of Germany

[73] Assignee: C. A. Weidmuller K.G., Detmold, Fed. Rep. of Germany

[21] Appl. No.: 195,819

[22] Filed: Oct. 10, 1980

[30] Foreign Application Priority Data

Oct. 16, 1979 [DE] Fed. Rep. of Germany ....... 2941770

[51] Int. Cl.³ .............................................. H01R 43/00
[52] U.S. Cl. ....................................... 29/883; 29/884; 264/272.14; 264/272.15; 264/277
[58] Field of Search ................. 29/856, 858, 863, 874, 29/876, 877, 883, 884, 885; 264/157, 259, 272.14, 272.15, 277; 339/218 R, 276 SF, 276 T

[56] References Cited

U.S. PATENT DOCUMENTS

| 2,040,674 | 5/1936 | Severance et al. | 339/218 R |
| 2,945,266 | 7/1960 | Mainardi | 264/277 |
| 2,963,775 | 12/1960 | Chadwick | 339/276 SF |
| 3,081,497 | 3/1963 | Scherry | 264/277 X |

Primary Examiner—Ervin M. Combs
Attorney, Agent, or Firm—Pollock, Vande Sande & Priddy

[57] ABSTRACT

To facilitate crimping, electrical crimp contacts comprising metal members and insulating members are manufactured in strip form. In a single injection molding operation, the insulating members are formed and attached to the metal members, and the insulating members are interconnected by integrally molding members. The latter may extend beyond the ends of the strip of contacts, so that such strips can be joined together.

4 Claims, 4 Drawing Figures

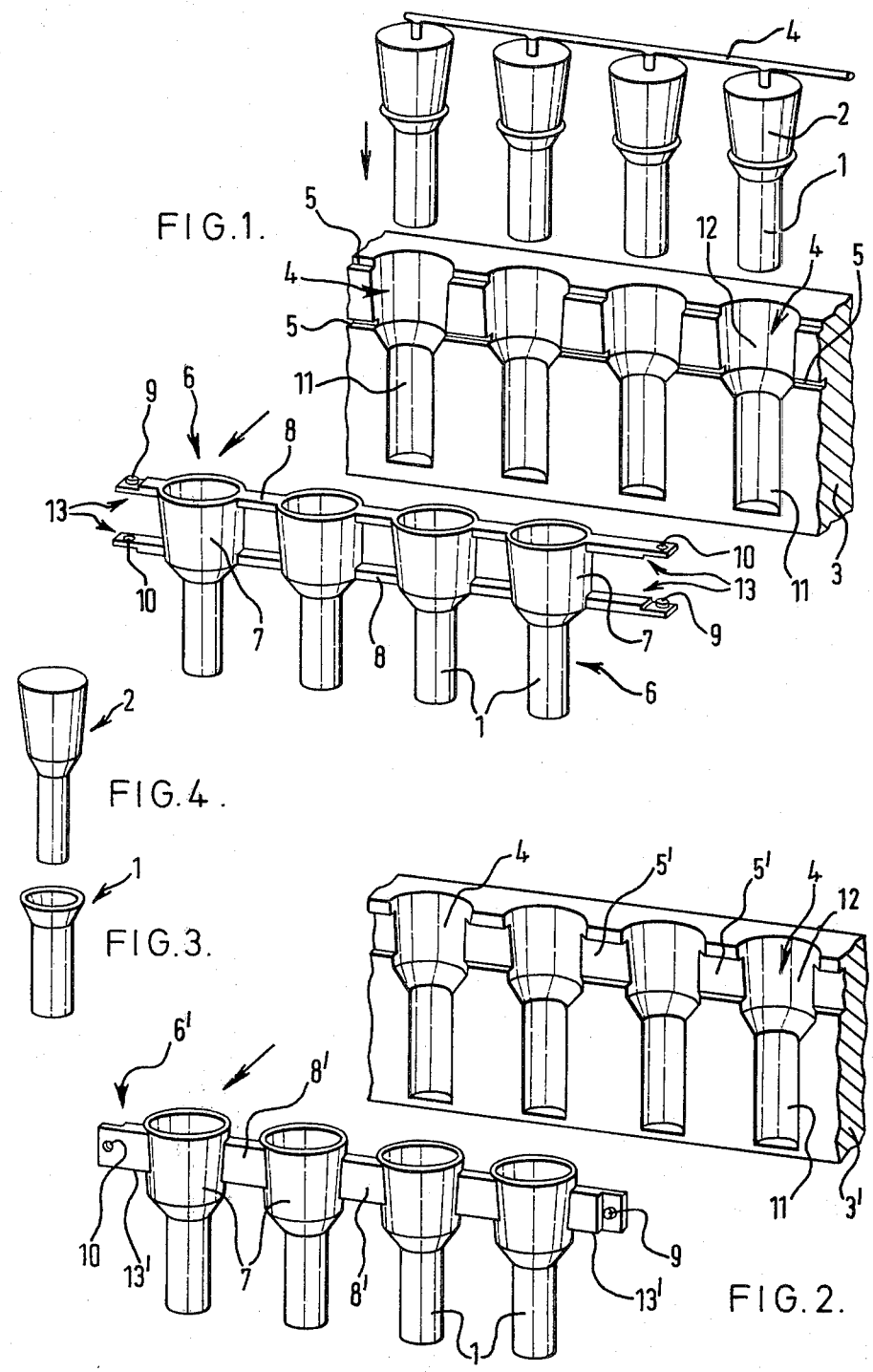

METHOD OF MAKING ELECTRICAL CONTACTS

This invention relates to the production of electrical contacts of the kind comprising a metal contact member and an insulating member.

The use of crimping to connect fine-gauge wire conductors to contacts with round or flat pins is well known. The pins are hollow, and the conductors are inserted into the hollow pins and fastened by crimpng of the pins. Crimping by machine is facilitated if the contacts are prepared in the form of a strip and are supplied in strip form to the crimping means.

Non-insulated contacts can readily be produced in the form of a strip, by simply retaining interconnecting webs when the contacts are formed by stamping or punching from strip or sheet metal. The interconnections are subsequently cut away.

However, for many uses it is desirable that the contact should include an insulating member. Hitherto, such contacts have been produced by injection molding individual insulating members onto individual metal contact members. To form strips for machine crimping, the individual contacts thus produced have been interconnected in a separate operation, by adhesively attaching the contacts to a carrier strip of film or the like. This requires a difficult separate operation, which is time-consuming and substantially increases the cost of producing the contacts.

An object of the invention is to provide a method and means for cheaply and efficiently producing insulated crimp contacts in strip form.

The present invention provides a method of producing a strip of mechanically interconnected electrical contacts, each comprising a metal contact member adapted to form a crimped connection and an insulating member attached thereto, in which method a plurality of the said contact members are placed adjacent to one another in injection molding means, said insulating members are formed and attached to the contact members by injection molding, and simultaneously members which mechanically interconnect the insulating members to form said strip are formed by injection molding.

The individual strips thus produced can be joined end to end, for example by interconnecting devices formed in the course of the injection molding process.

Since the interconnecting members are formed simultaneously with the molding of the insulating members, in the course of the injection molding operation which is in any case necessary to produce the insulating members of the contacts, the production of contact strips according to the present invention takes no longer than the hitherto conventional production of separate insulated contacts. The separate operation of assembling a strip of insulated contacts is completely eliminated, and the contact strips can be machine-crimped. The overall cost of production of the crimped contacts is therefore substantially reduced. The injection molding products, cheaply and simply, contact strips which can be relatively long, depending on the length of the injection mold. If longer strips are desired for machine crimping, they can easily be interconnected by means formed in the course of the injection molding, at the ends of the strips. In this way, the strips can be interconnected rapidly and easily, for feeding to a crimping machine as an effectively endless strip.

The present invention also provides apparatus for the production of strips of mechanically interconnected electrical contacts each comprising a crimpable metal contact member and an insulating member attached thereto, which apparatus comprises an injection molding die containing a plurality of adjacent cavities each adapted to receive a said contact member, and ducts which interconnect the said cavities. The ducts form webs of insulating material which interconnect the insulating members to form the contact strip.

In the accompanying drawings:

FIG. 1 shows a first injection mold for forming contact strips in accordance with the invention, and a strip thus molded, FIG. 2 shows a second form of injection moulding die and the contact strip molded thereby, FIG. 3 shows a metal contact member, and FIG. 4 shows a molding core.

The embodiments illustrated in the drawings, which are provided merely to exemplify the present invention, concern the production of contacts constituting end sockets with surrounding insulation, for crimped connnection to wire conductors. Each such contact includes a metal contact member 1, shown in FIG. 3, which is tubular with one end flared. As can be seen in FIGS. 1 and 2, each contact also has an insulating sleeve 7 which forms a frusto-conical extension of the flared end of the metal contact member.

The insulating members 7 are molded and attached to the metal contact members 1 in injection molding apparatus including a die 3 and cores 2. The die is a split die, only one half being shown in FIG. 1. It contains a row of molding cavities 4 side by side, each shaped to accommodate a metal contact member 1 and an associated core 2 for shaping an insulating member 7 internally and externally. The cores are made of metal and are interconnected by a bar 4' to form a core assembly with the cores in the same relative positions as the cavities in the die.

Before molding, the metal contact members 1 are placed on respective cores, and the resulting assembly of cores and contact members is inserted in the die.

Each mold cavity has a lower part 11 in which the metal contact member is a close fit, and an upper region 12 which receives the corresponding core 2 with a radial gap. The upper regions of the cavities are interconnected by upper and lower ducts 5 of flat, narrow rectangular form. These ducts extend longitudinally outwards from the ends of the row of molding cavities.

After insertion of the core and contact member assembly and closure of the mold, plastic insulating material is injected into the mold to fill the ducts 5 and the radial gaps between the cores and the walls of the upper parts 12 of the die cavities.

The injected material becomes attached to the flared ends of the metal contact members to form the insulating members 7, and the plastic material molded in the ducts 5 forms webs 8 which interconnect the insulating members 7 to form a strip 6 of contacts as shown in the lower part of FIG. 1.

To enable such strips to be connected to one another end to end, for example for feeding to a crimping machine, projecting tabs 13 are formed by the plastic material molded in the outermost end regions of the ducts 5. Interconnecting elements are integrally formed on these longitudinally projecting tabs 13. In the illustrated embodiment, these are studs 9 and corresponding holes 10 into which the studs 9 of adjacent strips can be clipped.

The embodiment shown in FIG. 2 differs from that shown in FIG. 1 only in that the two ducts 5 are replaced by a single larger duct 5′, whose cross section is elongated in the axial direction of the contacts. The resulting contact strip 6′ has a single projecting tab 13′ at each end, with an interconnecting stud 9 and hole 10 for assembly of effectively endless strips of contacts.

The contact strips produced as shown in FIG. 1 or FIG. 2 are transferred, individually or interconnected end to end, to a crimping machine in which a fine-gauge wire conductor is inserted in each metal contact member 1, and the latter are crimped onto the inserted conductors. The crimped contacts, according to the intended use, can be left interconnected mechanically, or can be separated into individual contacts or contact groups, by cutting or removal of the interconnecting members 8, 8′, preferably simultaneously with the crimping operation. The projecting tabs 13 can also be removed.

We claim:

1. A method of making a strip of mechanically interconnected insulated electrical contacts each comprising a tubular crimpable metal contact pin and an insulating tubular plastic sleeve extending from one end of said contact pin, comprising the steps of
    (a) providing an injection mold having a plurality of elongated mold cavities side by side, each cavity having first and second opposite end regions, and said mold further having ducts transversely interconnecting said first end regions of said mold cavities;
    (b) disposing a respective said contact pin in the second end region of each said cavity; and
    (c) injecting plastic material into said first end regions and said ducts, thereby forming in said first end regions said insulating tubular plastic sleeeves directly bonded to respective ends of said contact pins in substantially end-to-end relation, said sleeves having a larger diameter than, and extending axially away from, said contact pins, and forming in said ducts members integral with said sleeves and mechanically interconnecting said sleeves to form said strip of interconnected contacts.

2. A method of making a strip of mechanically interconnected insulated electrical contacts each comprising a tubular crimpable metal contact pin and an insulating tubular plastic sleeve extending from an end of said contact pin, comprising the steps of
    (a) providing an injection mold having a plurality of mold cavitites side by side, each cavity being an elongated cavity having first and second opposite end regions, said mold further having ducts transversely interconnecting said first end regions of said mold cavities;
    (b) disposing a said contact pin in said second end region of each said cavity;
    (c) disposing a molding core in said first end region of each said cavity contiguously with said contact pin in said cavity; and
    (d) injecting plastic material into said first end regions and said ducts, thereby forming in said first end regions said insulating tubular plastic sleeves directly bonded to said contact pins in substantially end-to-end relation, said sleeves having a larger diameter than, and extending axially away from, said contact pins, and forming in said ducts members integral with said sleeves and mechanically interconnecting said sleeves to form said strip of interconnected insulated contacts.

3. Method according to claim 2, including the steps of transferring said strip to a crimping station, and there securing said metal contact pins to respective wire conductors by crimping said contact members.

4. Method according to claim 3, wherein said mold comprises at least one group comprising a plurality of said mold cavities side by side, said ducts extending between the mold cavities of said group and longitudinally outwards therefrom, said longitudinally outwardly extending ducts defining respective complementary interconnecting means, whereby said plastic material when injection molded forms projecting end portions of the said strip, which end portions incorporate said respective complementary interconnecting means, a plurality of such molded strips being fastened together end to end by said interconnecting means thereof, and said interconnected strips being transferred to said crimping station.

* * * * *